(12) United States Patent
Rodriguez Bravo et al.

(10) Patent No.: US 12,267,433 B2
(45) Date of Patent: Apr. 1, 2025

(54) SECURITY FOR USB-BASED DEVICE CONFIGURATION

(71) Applicant: KYNDRYL, INC., New York, NY (US)

(72) Inventors: Cesar Augusto Rodriguez Bravo, Alajuela (CR); Carolina Garcia Delgado, Jalisco (MX); Desilda Toska, Alajuela (CR); Mauro Marzorati, Lutz, FL (US)

(73) Assignee: Kyndryl, Inc., New York, NY (US)

( * ) Notice: Subject to any disclaimer, the term of this patent is extended or adjusted under 35 U.S.C. 154(b) by 382 days.

(21) Appl. No.: 17/508,490

(22) Filed: Oct. 22, 2021

(65) Prior Publication Data
US 2023/0126238 A1 Apr. 27, 2023

(51) Int. Cl.
| | |
|---|---|
| H04L 9/32 | (2006.01) |
| G06F 13/38 | (2006.01) |
| G06F 13/42 | (2006.01) |
| G06K 7/14 | (2006.01) |

(52) U.S. Cl.
CPC .......... *H04L 9/3236* (2013.01); *G06F 13/382* (2013.01); *G06F 13/4282* (2013.01); *G06K 7/1413* (2013.01); *G06K 7/1417* (2013.01); *H04L 9/3263* (2013.01); *G06F 2213/0042* (2013.01)

(58) Field of Classification Search
CPC ... H04L 9/3236; H04L 9/3263; G06F 13/382; G06F 13/4282; G06F 2213/0042; G06K 7/1413; G06K 7/1417
See application file for complete search history.

(56) References Cited

U.S. PATENT DOCUMENTS

| | | | |
|---|---|---|---|
| 8,006,023 B1 * | 8/2011 | Pan | G06F 13/385 710/313 |
| 8,528,096 B2 | 9/2013 | Fruhauf et al. | |
| 10,084,820 B2 | 9/2018 | Perez | |
| 10,360,668 B1 * | 7/2019 | McGregor | G06T 7/0002 |
| 2009/0049510 A1 | 2/2009 | Zhang et al. | |

(Continued)

FOREIGN PATENT DOCUMENTS

| | | |
|---|---|---|
| CN | 102006302 | 6/2014 |
| CN | 106446729 | 2/2017 |
| WO | 2012111018 | 8/2012 |

OTHER PUBLICATIONS

Pascal Urien "Innovative Countermeasures to Defeat Cyber Attacks Against Blockchain Wallets" 2021 5th Cyber Security in Networking Conference (CSNet), Oct. 12, 2021, p. 49-54 (Year: 2021).*

(Continued)

*Primary Examiner* — Carl G Colin
*Assistant Examiner* — Zhe Liu
(74) *Attorney, Agent, or Firm* — Erik Swanson; Andrew M. Calderon; Calderon Safran & Wright P.C.

(57) ABSTRACT

A universal serial bus device, including: a main body; a connection portion attached to the main body; a processor; a storage portion storing a hash function executable by the processor, the hash function producing a hash value; a non-changing visual code on the main body, the visual code being readable by an optical scanner and corresponding to the hash function; and an electronic display configured to display the hash value.

20 Claims, 7 Drawing Sheets

(56) References Cited

U.S. PATENT DOCUMENTS

| | | | |
|---|---|---|---|
| 2009/0106563 A1 | 4/2009 | Cherpantier | |
| 2011/0179289 A1* | 7/2011 | Guenther | G06F 21/83 |
| | | | 713/189 |
| 2013/0055044 A1 | 2/2013 | Eljezovic et al. | |
| 2015/0134552 A1* | 5/2015 | Engels | G06Q 10/087 |
| | | | 705/318 |
| 2016/0346609 A1* | 12/2016 | Bailly | G06V 40/23 |
| 2017/0177871 A1* | 6/2017 | Salomon | G06F 13/385 |
| 2018/0046421 A1* | 2/2018 | Mazurek | G06F 12/0246 |
| 2018/0114045 A1* | 4/2018 | Ebrahimi | H04L 9/3247 |
| 2020/0013026 A1* | 1/2020 | Noonan | G06Q 20/38215 |
| 2020/0344046 A1* | 10/2020 | Lindeman | H04L 9/3218 |
| 2020/0374129 A1* | 11/2020 | Dilles | H04L 9/3273 |
| 2022/0239493 A1* | 7/2022 | Walters | H04L 63/0853 |

OTHER PUBLICATIONS

Lee et al., "A Study on a Secure USB Mechanism That Prevents the Exposure of Authentication Information for Smart Human Care Services", https://www.hindawi.com/journals/js/2018/2089626/, Hindawi, Oct. 29, 2018, 18 pages.

Helmbrecht et al., "IBM FlashSystem 900 Model AE3 Product Guide", IBM Redbooks, Apr. 4, 2019, 32 pages.

Techeblog, "One-Step USB Drive Has an Integrated OLED Touchscreen Display and Fingerprint Scanner", https://www.techeblog.com/one-step-usb-drive-has-an-integrated-oled-touchscreen-display-and-fingerprint-scanner/, Techeblog, Sep. 7, 2018, 12 pages.

Tudor Raiciu, "Memorex First to Deliver USB Flash Drive With Built-In LCD Display", https://news.softpedia.com/news/Memorex-First-to-Deliver-USB-Flash-Drive-With-Built-In-LCD-Display-10507.shtml, Softpedia News, Oct. 14, 2005, 2 pages.

USB Company, "Top Ten Tips When Purchasing a Promotional USB Memory Stick", http://www.usbcompany.co.uk/blog/top-ten-tips-purchasing-promotional-usb-memory-stick/, USB Company, Nov. 21, 2013, 10 pages.

Siddhartha Penugonda, "New USB Flash Drive Concept", http://techieaddiction.blogspot.com/2012/06/new-usb-flash-drive-concept.html, Techie Addiction, 2013, 2 pages.

Veghsandor, "USB flash pendrive with \\\"Secured\\\" text on display with padlock (data security concept)", https://www.123rf.com/photo_39031320_usb-flash-pendrive-with-secured-text-on-display-with-padlock-data-security-concept-.html, 123RF, accessed Oct. 18, 2021, 2 pages.

Hanlon, "New flash drive with scrollable display of stored files plus SD Card Reader/Writer", https://newatlas.com/new-flash-drive-with-scrollable-display-of-stored-files-plus-sd-card-readerwriter/5416/, New Atlas, Mar. 28, 2006, 9 pages.

Megaeshop, "3V-30V 5.1A USB Tester Current Voltage Charger Capacity Doctor Digital LCD Display", https://megaeshop.pk/3v-30v-5-1a-usb-tester-current-voltage-charger-capacity-doctor-digital-LCD-display.html, Megaeshop, accessed Oct. 18, 2021, 3 pages.

Dustin, "Adding Custom Data to X.509 SSL Certificates", https://dustinoprea.com/2014/04/18/adding-custom-data-to-x-509-ssl-certificates/, Apr. 18, 2014, 8 pages.

Anonymously, "Code Signing Certificate vs SSL Certificate: What's The Difference?", https://comodosslstore.com/resources/code-signing-certificate-vs-ssl-certificate-whats-the-difference/, Comodo SSL Store, accessed Oct. 18, 2021, 3 pages.

Mell et al., "The NIST Definition of Cloud Computing", NIST, Special Publication 800-145, Sep. 2011, 7 pages.

Unknown, "CSSHL/ESP8266-Arduino-cryptolibs", https://github.com/CSSHL/ESP8266-Arduino-cryptolibs/blob/master/sha256/sha256.h, downloaded Oct. 22, 2021, 3 pages.

Unknown, "SHA256.h", https://rweather.github.io/arduinolibs/SHA256_8h_source.html, downloaded Oct. 22, 2021, 2 pages.

Unknown, "tzikis/ArduinoMD5"https://github.com/tzikis/ArduinoMD5, downloaded Oct. 22, 2021, 4 pages.

\* cited by examiner

SECURITY FOR USB-BASED DEVICE CONFIGURATION

BACKGROUND

Aspects of the present invention relate generally to device configuration and, more particularly, to increased security device configuration using a universal serial bus (USB) drive.

Some computer hardware components require setup and/or initialization upon receipt by a user. Some such computer hardware components require the installation of software prior to, or as part of, the set up and/or initialization. A USB drive can be used for transferring the software to the computer hardware component.

SUMMARY

In a first aspect of the invention, there is a universal serial bus device, including: a main body; a connection portion attached to the main body; a processor; a storage portion storing a hash function executable by the processor, the hash function producing a hash value; a non-changing visual code on the main body, the visual code being readable by an optical scanner and corresponding to the hash function; and an electronic display configured to display the hash value.

In another aspect of the invention, there is a method including: initiating a calculation by a target device having an electronic display and content, the calculation being of a hash of the content of the target device to create a hash value; displaying the hash value on the display of the target device; in response to a determination that the hash value on the display matches the predetermined hash value, validating the content of the target device; and in response to a determination that the hash value on the display does not match the predetermined hash value, failing to validate the content of the target device.

In another aspect of the invention, there is a computer implemented method, including: creating, by a computer device, a hash value, the hash value being created using a hash function resident in a memory of the computer device; displaying, by the computer device, the hash value on an electronic display on the computer device; and displaying a non-changing visual code on a body of the computer device, the visual code being readable by a code reader and corresponding to an acceptable value of the hash value.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
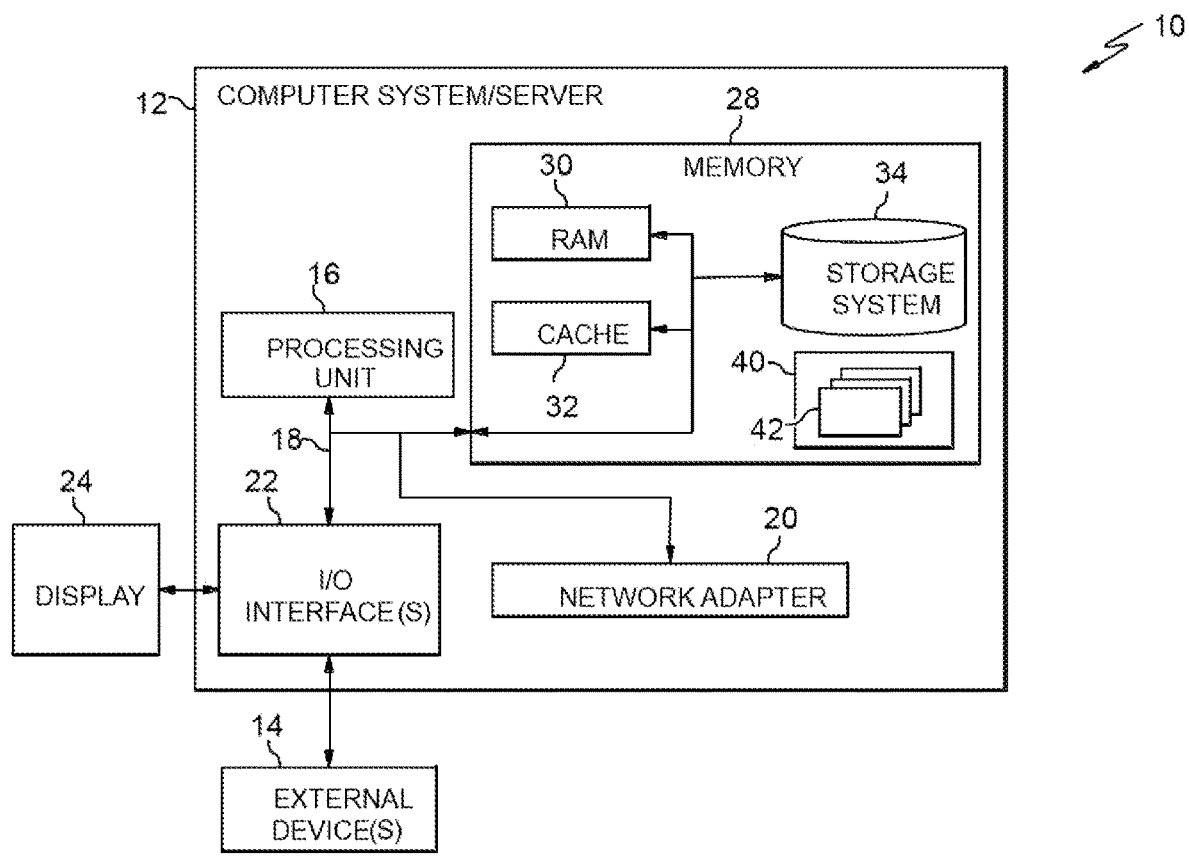
FIG. 1 depicts a cloud computing node according to an embodiment of the present invention.

Aspects of the present invention relate generally to device configuration and, more particularly, to increased security device configuration using a universal serial bus (USB) drive. According to aspects of the invention a target device such as, for example, a USB drive calculates a hash value of a hash function run on a processor in the USB drive, and an indelible visual code is provided on a body of the USB drive. In embodiments, the indelible visual code corresponds to a URL that produces a predetermined hash value. A user of the USB drive compares the calculated hash value to the predetermined hash value to determine if the USB drive has been tampered with. In this manner, implementations of the invention provide increased security to USB drives containing hardware initiation, or other, software.

Embodiments include a computer-implemented process for verification of content of a target device, the computer-implemented process including: in response to receiving the target device, initiating a calculation of a hash of the content of the target device to create a hash value; presenting the hash value on a display associated with the target device; determining whether the hash value on the display matches a predetermined hash value; in response to a determination that the hash value on the display matches the predetermined hash value, validating the content of the target device; in response to a determination that the hash value on the display does not match the predetermined hash value, indicating the content the target device may have been modified; in response to scanning a quick reference code associated with the target device, displaying information, associated with a corresponding universal resource locator, comprising a secure socket layer certificate associated with the content of the target device; in response to validating the content of the target device and the secure socket layer certificate associated with the content of the target device, indicating the content of the target device is safe to use.

Computer hardware components, particularly high value computer hardware components, are supplied with a USB (or other) device that contains software that is used in the initialization of the components. The security of the software from alteration or other tampering is important to the security of the component and any system in which the component is to be installed. Implementations of the invention address this technological problem with the technological solution of generating a calculated hash value of a hash function resident on the USB device and providing an indelible visual code on the body of the USB device. The visual code is readable by a code reader that produces a predetermined hash value that corresponds to the visual code. A user of the USB device compares the calculated hash value to the predetermined hash value to validate, or fail to validate, the secure state of the USB device. By reducing the likelihood of tampering with the USB device, implementations of the invention reduce the costs associated with tampering with initialization software for computer hardware components.

It should be understood that, to the extent implementations of the invention collect, store, or employ personal information provided by, or obtained from, individuals, such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
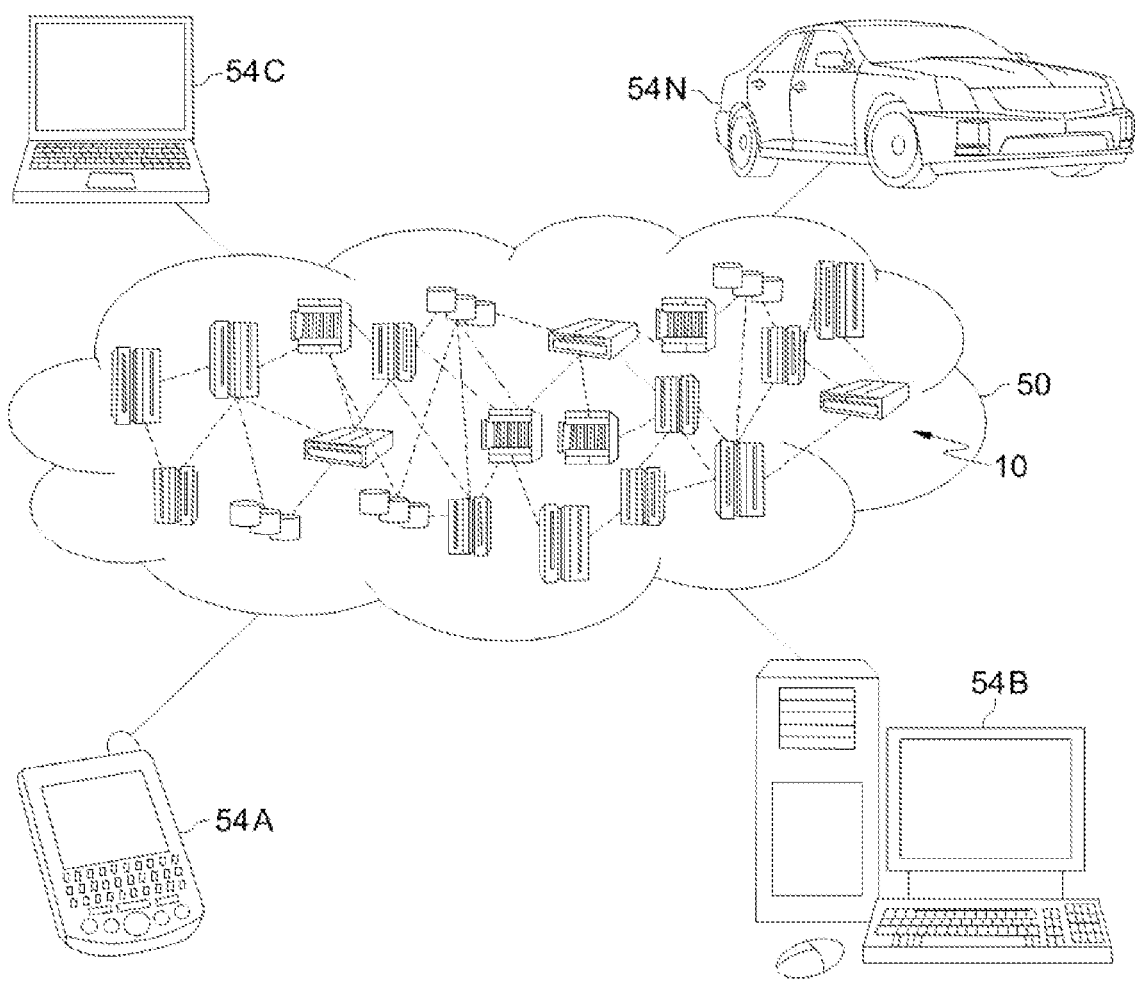
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
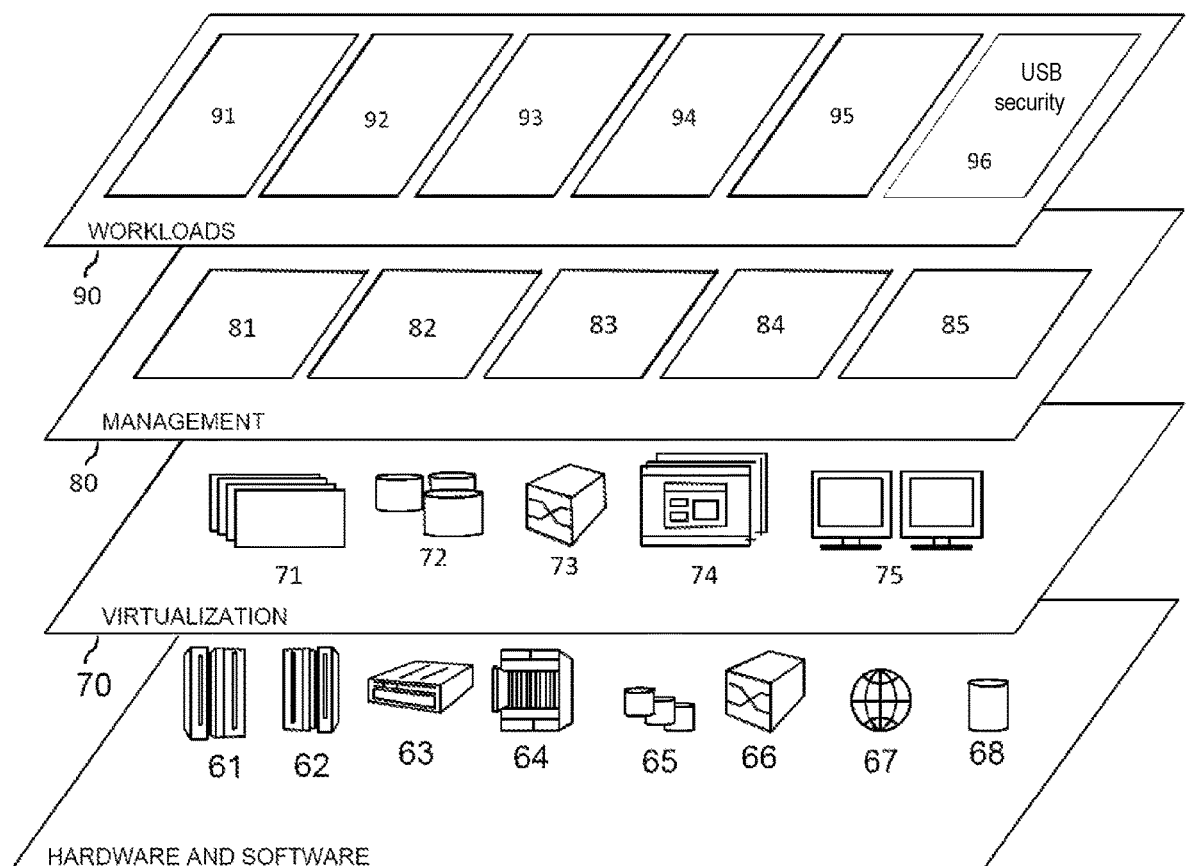
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and USB security 96.

Implementations of the invention may include a computer system/server 12 of FIG. 1 in which one or more of the program modules 42 are configured to perform (or cause the computer system/server 12 to perform) one of more functions of the USB security 96 of FIG. 3. For example, the one or more of the program modules 42 may be configured to: create a hash value, the hash value being created by a hash function resident in a memory of a computer device; and display, by the computer device, the hash value on an electronic display on the computer device.

As described above, some computer hardware components require setup and/or initialization upon receipt by a user. Some such computer hardware components require the installation of software prior to, or as part of, the set up and/or initialization. A USB drive can be used for transferring the software to the computer hardware component. A problem exists in that some of the USB drives used with the computer hardware components can be compromised and infect the computer hardware components with viruses and/or other malicious software. Embodiments of the invention provide a solution to this problem by providing a security feature that allows the confirmation of a hash value before the USB drive is inserted into, or otherwise used with, the computer hardware component.

Embodiments include a method for displaying in real time a hash of the content of the device, for example, a USB device, that can be easily matched to a known good value of the hash that is indelibly etched onto the device as a stand-alone visual tamper-evidence mechanism. This allows the validation of a manufacturing distribution USB medium before insertion of the USB into any system.

Embodiments include two main components: digital certification; and the USB device.

Digital Certification

In embodiments, during the establishment of a distribution media package to be used with the hardware component, an x.509 certificate signing request (CSR) is produced such that the known good hash value of the content is embedded using, for example, the Arbitrary Extension mechanism. In embodiments, this CSR is signed with a certificate authority (CA) and is operated in the same fashion as a secure socket layer (SSL) certificate or transport layer security (TLS). In embodiments, during the manufacturing process of the distribution media, a well-known space-efficient visual-encoding scheme (such as a quick reference (QR) code) is displayed on a body of the USB device. In embodiments, the visual-encoding scheme is permanently etched (as a three-dimensional feature) onto a reserved space on a body of the USB device. In embodiments, the visual-encoding scheme (code) corresponds to a universal resource locator (URL) which, when read by a code reader, loads an x.509 certificate using the hypertext transfer protocol secure (HTTPS) scheme. In embodiments, upon receipt of, and prior to inserting the USB into the target system, the user uses a code reader to read the code, which loads the URL onto the reader. In embodiments, the code reader displays at least a portion of the contents of an object referenced by the URL, which contains the known good hash value and is accompanied by the CA-signed certificate bearing the known good hash value in the extension.

The USB Device

In embodiments, a USB drive includes display such as, for example, a low-power screen, a button, and an empty space. In embodiments, upon receipt of, and prior to inserting the USB drive into the hardware component, the user presses the provided button to initiate a program stored on the USB drive. In embodiments, the program calculates a one-way hash value from content stored on the USB drive. The newly calculated one-way hash is displayed on the low-power display for the user to visually inspect. The user then compares the calculated one-way hash to the known good hash value displayed on the code reader, resulting in a two-way agreement. In embodiments, the calculated one-way hash matching the known good hash value indicates to the user that the contents of the USB drive are authentic and have not been tampered with. In embodiments, the calculated one-way hash not matching the known good hash value indicates to the user that the contents of the USB drive may have been tampered with, and the USB drive should not be used in the initialization of the hardware component. In this manner, embodiments of the invention help prevent the hardware components (and possibly a system in which the hardware component is installed) from being subjected to infection or other damage.

Embodiments provide added security by requiring a three-way agreement between: (1) the calculated hash displayed on the display of the USB device; (2) the hash value supplied via the SSL or TLS; and (3) a hash value present in the content of the object referenced by the URL. Embodiments provide further security by also delivering the good known hash value to the code reader within an HTTP header, which provides a four-way agreement mechanism.

In embodiments, the device, for example the USB device, contains a battery for powering a processor that performs the calculation and for powering the display. In embodiments, the battery is rechargeable by an inert USB charging device so that the battery can be recharged without subjecting any computer system to any malicious software potentially on the USB device. In embodiments, a capacitor further enhances the USB device in such a manner that a long-press of the button, for example, causes the energy from the capacitor to be discharged onto a memory chip in the USB device to initiate and/or perform a self-destruct mechanism that destroys the contents of the USB device. This self-destruct mechanism allows the user to destroy the contents of the USB device in order to prevent any use of the USB device. For example, a user may want to destroy the contents of the USB device after the USB device is properly used, and/or to prevent any further use of the USB device for any purpose.

Embodiments provide on-demand calculation and independent display of the hash value of the actual content of a USB device autonomously (without the need of any auxiliary components). Embodiments use the Arbitrary Extension mechanism in the x.509 standard to record an arbitrary value representing the known-good hash of distribution media contents. Embodiments use the HTTPS scheme to deliver known-good hash values in a secure manner at multiple layers such as, for example, TLS, HTTP, hypertext markup language (HTML), or Java Script object notation (JSON). Embodiments use permanent etching of verification codes (for example, QR codes) onto distribution media (for example, USB drives) matched to multiple-layer verification mechanisms.

In some modern computing environments TLS, HTTP, and HTML/JSON operations are ensconced in different delivery organizations. Embodiments require overpowering the controls in each of these environments in order for an unauthorized user to insert a false known-good value in the validation chain. Simple withdrawal of the certificate, HTTP or HTML/JSON object causes the validation to fail and thus authoritatively conveys an opinion about the suitability/unsuitability of the provided distribution at any time. In embodiments, the use of standard x.509 SSL certificates, unlike in x.509 code-signing certificates, requires continual validation of certificate validity (expiration dates) while providing on-demand invalidation or revocation using certificate revocation list (CRL) protocol.

Embodiments allow for new known-good values to be securely published allowing on-going verification because the etched value on the device stays the same while the semi-permanent display and the validation value is variable. This allows on-going verification of code health in headless devices, such as, for example: controllers and industrial IoT devices; supervisory control and data acquisition (SCADA) systems; and robotic equipment. Embodiments are applicable to many computing environments, such as, for example: servers; networking equipment; and SCADA Systems.

Figure 4:
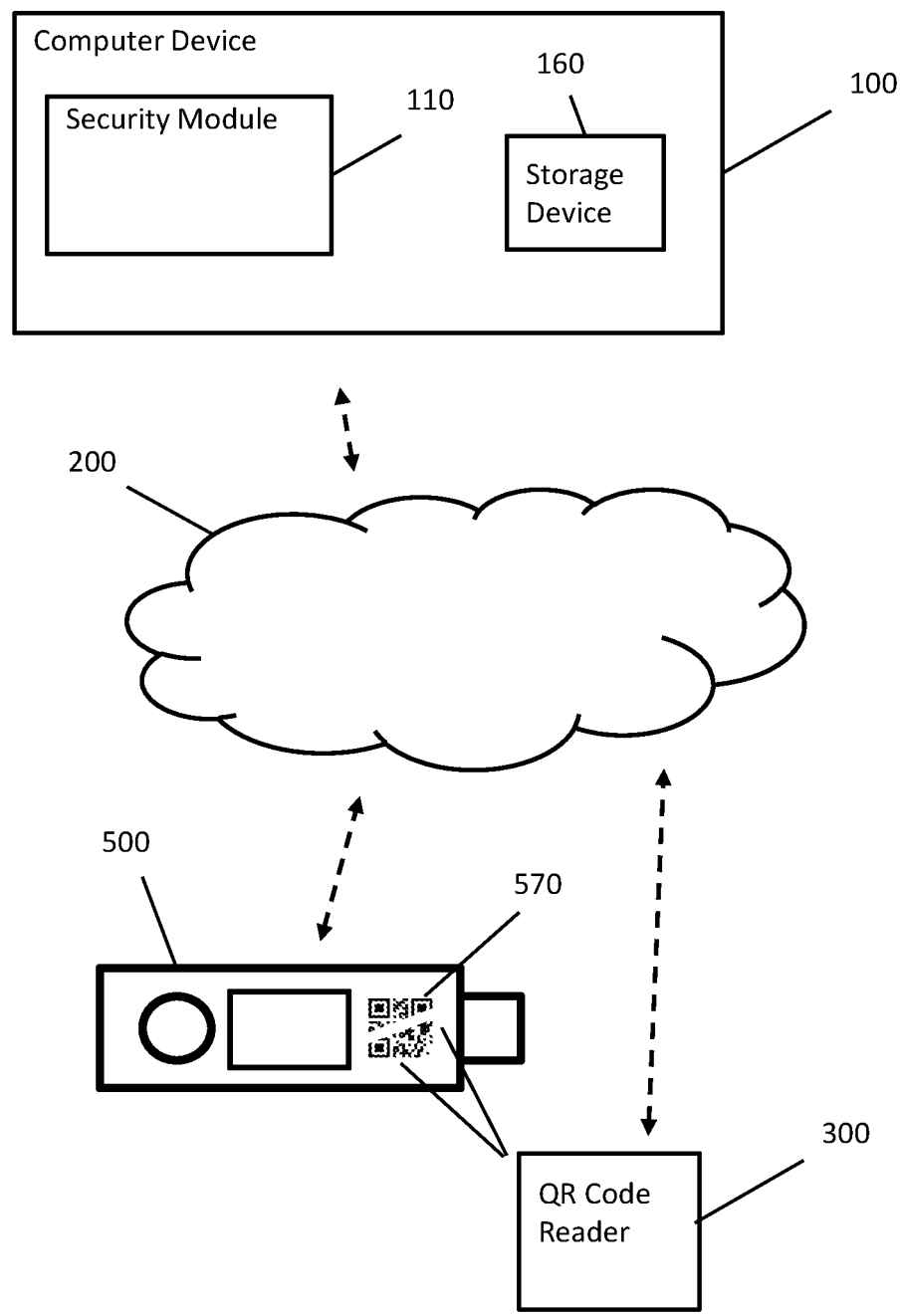
FIG. 4 shows a block diagram of an exemplary environment in accordance with aspects of the invention.

FIG. 4 shows a block diagram of an exemplary environment in accordance with aspects of the invention. In embodiments, the environment includes a computer device 100 such as, for example, computer system/server 12 in FIG. 1, that communicates over one or more networks 200 such as, for example, cloud computing environment 50 of FIG. 2. In this example, computer device 100 includes a security module 110, for example, one or more of program modules 42 in FIG. 1, and a storage device 160 such as, for example, storage system 34 in FIG. 1. Computer device 100 may include additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

Also shown in FIG. 4 is a target device 500. In this example, target device 500 is a USB device. A code reader (for example, a QR code reader) 300 is shown. Target device 500 contains a code 570 that is readable by code reader 300.

Figure 5:
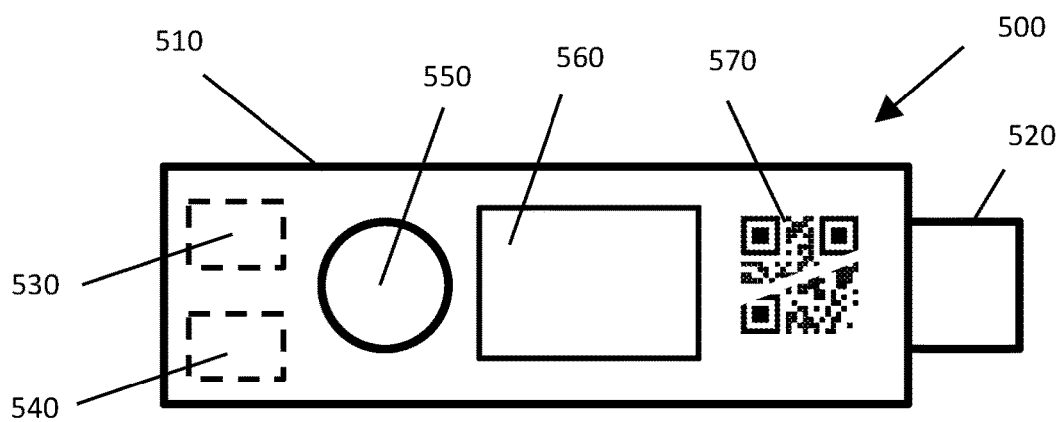
FIG. 5 shows a schematic representation of a USB device in accordance with aspects of the invention.

FIG. 5 shows an example of target device 500. In this example, target device 500 is a UBS drive having a body 510 and a USB connector 520. In embodiments, USB connector 520 is any standard, or proprietary, connection that connects USB drive 520 to a computer hardware component through a USB port. Also shown in FIG. 5 is a processor 530 and memory 540 that is operatively connected to processor 530. In embodiments, memory 540 is computer memory that is accessible by processor 530 and contains a hash function that is used by processor 530 to calculate a hash value. In this example, target device 500 has a button 550 that is activated by a user to begin the calculation of the hash value by processor 530. In this example, an electronic display 560 displays the hash value calculated by processor 530. In embodiments, target device 500 has a space on body 510 in which a visual code 570 is indelibly located. In this example, code 570 is a QR code. In other embodiments, visual code 570 is some other visual code such as a bar code, for example.

Figure 6:
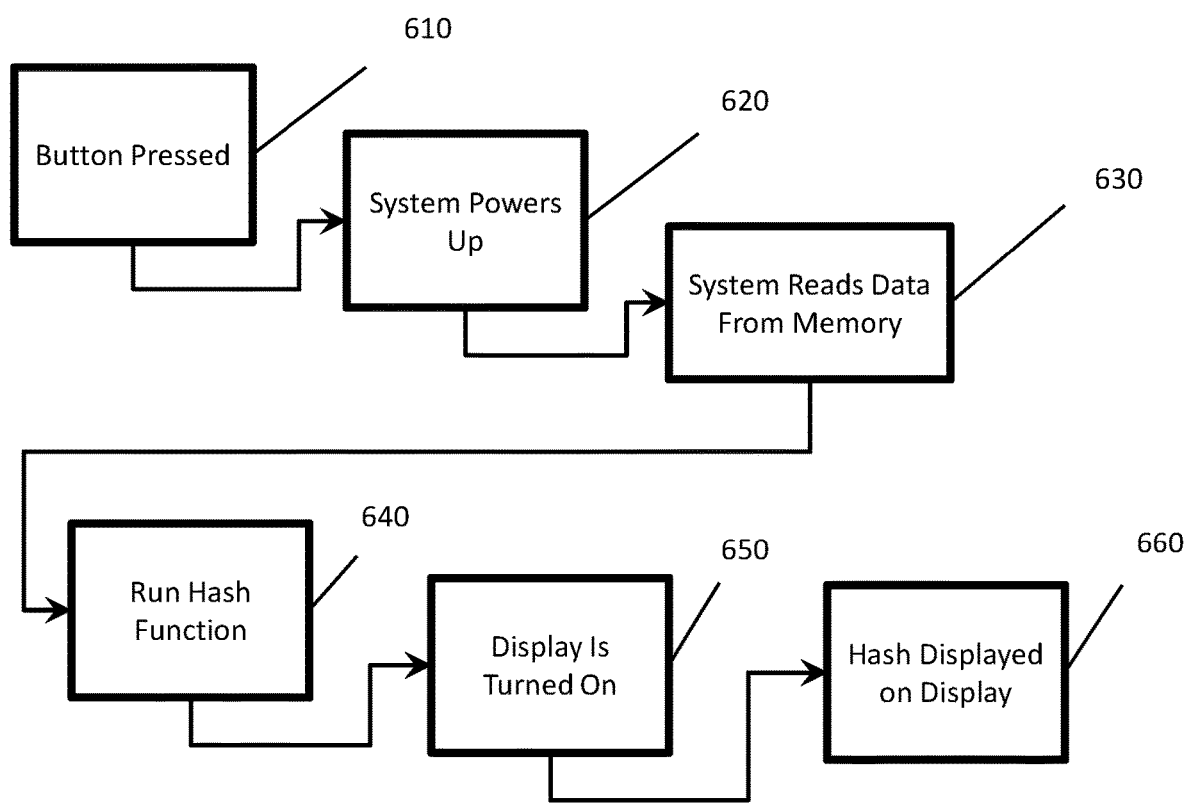
FIG. 6 shows a flowchart of an exemplary method in accordance with aspects of the invention.

FIG. 6 shows an exemplary flow of use of embodiments of the invention. At 610, button 550 is pressed by a user. At 620, the system (for example, processor 530) powers up and, at 630, the system reads data from memory 540. In embodiments, the data in memory 540 includes a hash function and seed data that is used by the hash function. At 640, processor 530 runs the hash function. At 650, display 560 is provided power and, at 660, a hash value resulting from the hash function is displayed on display 560.

Figure 7:
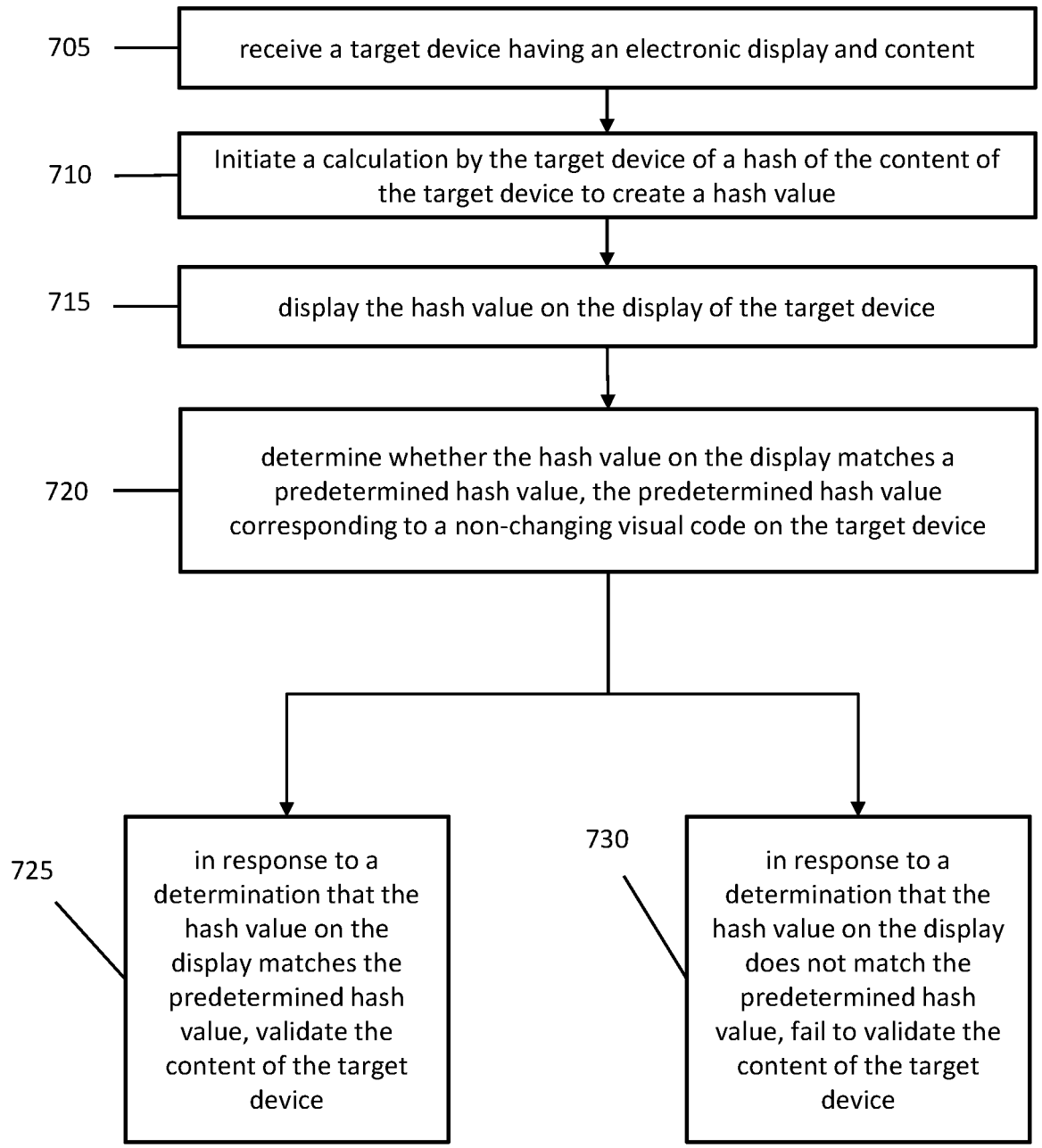
FIG. 7 shows a flowchart of an exemplary method in accordance with aspects of the invention.

FIG. 7 shows a flowchart of an exemplary method in accordance with aspects of the present invention. Steps of the method may be carried out in the environment of FIGS. 4 and 5 and are described with reference to elements depicted in FIGS. 4 and 5.

At step 705, a user receives a target device having an electronic display and content. In embodiments, a user receives target device 500.

At step 710, the system initiates a calculation by the target device of a hash of the content of the target device to create a hash value. In embodiments, and as described with respect to FIGS. 4 and 5, processor 530 initiates a calculation by the target device of a hash of the content of the target device to create a hash value.

At step 715, the system displays the hash value on the display of the target device. In embodiments, and as described with respect to FIGS. 4 and 5, the hash value calculated by processor 530 is displayed on display 560 of target device 500.

At step 720 the user determines whether the hash value on the display matches a predetermined hash value, the predetermined hash value corresponding to a non-changing visual code on the target device. In embodiments, and as described with respect to FIGS. 4 and 5, the user determines whether the hash value on display 560 matches a predetermined hash value, the predetermined hash value corresponding to visual code 570 on body 510 of target device 500 by comparing the hash value displayed on display 560 to a hash value displayed on code reader 300 after code reader 300 reads visual code 570.

At step 725, the user, in response to a determination that the hash value on the display matches the predetermined hash value, validates the content of the target device. In embodiments, and as described with respect to FIGS. 4 and 5, the user, in response to determining that the hash value on display 560 matches the predetermined hash value on code reader 300, validates the content of target device 500.

At step 730, the user, in response to a determination that the hash value on the display does not match the predetermined hash value, fails to validate the content the target device. In embodiments, and as described with respect to FIGS. 4 and 5, the user, in response to determining that the hash value on display 560 does not match the predetermined hash value on code reader 300, fails to validate the content of target device 500.

Figure 8:
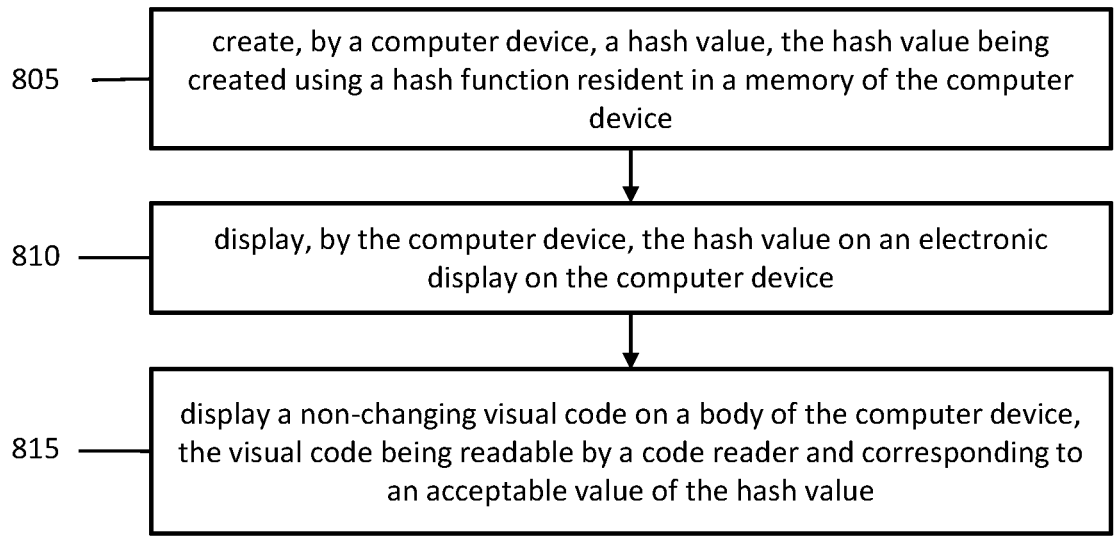
FIG. 8 shows a flowchart of an exemplary method in accordance with aspects of the invention.

FIG. 8 shows a flowchart of an exemplary method in accordance with aspects of the present invention. Steps of the method may be carried out in the environment of FIGS. 4 and 5 and are described with reference to elements depicted in FIGS. 4 and 5.

At step 805, the system creates, by a computer device, a hash value, the hash value being created by a hash function resident in a memory of the computer device. In embodiments, and as described with respect to FIGS. 4 and 5, target device 500 creates a hash value, the hash value being created by processor 530 using a hash function resident in memory 540 of target device 500.

At step 810, the system displays, by the computer device, the hash value on an electronic display on the computer device. In embodiments, and as described with respect to FIGS. 4 and 5, target device 500 displays the hash value on display 560 on target device 500.

At step 815, the system displays a non-changing visual code on a body of the computer device, the visual code being readable by a code reader and corresponding to an acceptable value of the has value. In embodiments, and as described with respect to FIGS. 4 and 5, target device 500 displays a visual code 570 on body 510 of target device 500, visual code 570 being readable by code reader 300 and corresponding to an acceptable value of the hash value.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A universal serial bus device, comprising:
    a main body;
    a connection portion attached to the main body;
    a processor;
    a storage portion storing a hash function executable by the processor, the hash function producing a hash value that is a real-time hash value of a content in the storage portion;
    a non-changing visual code on the main body, the non-changing visual code being readable by an optical scanner and corresponding to a predetermined hash value; and
    an electronic display configured to display the hash value, wherein the displayed hash value is compared to the non-changing visual code corresponding to the predetermined hash value and another hash value obtained using a certificate signing request to validate a secure state of the universal serial bus device, wherein the predetermined hash value is embedded in a certificate using an extension mechanism.

2. The device of claim 1, wherein the non-changing visual code represents a uniform resource locator corresponding to the predetermined hash value.

3. The device of claim 2, wherein the uniform resource locator is an address of a website that contains an acceptable value of the predetermined hash value.

4. The device of claim 3, wherein the non-changing visual code is a quick response code.

5. The device of claim 2, wherein the universal resource locator corresponds to an x.509 certificate.

6. The device of claim 1, wherein the non-changing visual code is a quick response code.

7. The device of claim 1, wherein the non-changing visual code is a three-dimensional feature of the main body.

8. The device of claim 1, wherein the non-changing visual code is etched into the main body.

9. The device of claim 1, wherein the device is a universal serial bus memory device.

10. A method, comprising:
    initiating a real time calculation by a target device having an electronic display and content, the calculation being of a hash of the content of the target device to create a hash value;
    displaying the hash value on the display of the target device;
    producing a predetermined hash value from a non-changing visual code of the target device, the non-changing visual code being readable by an optical scanner;
    obtaining another hash value utilizing a certificate signing request;
    in response to a determination that the hash value on the display matches the predetermined hash value and the another hash value, validating the content of the target device, wherein the predetermined hash value is embedded in a certificate using an extension mechanism; and
    in response to a determination that the hash value on the display does not match the predetermined hash value and the another hash value, failing to validate the content of the target device.

11. The method of claim 10, wherein the predetermined hash value corresponds with the non-changing visual code that includes a quick reference code associated with the target device.

12. The method of claim 11, wherein the non-changing visual code is etched into the main body of the target device.

13. The method of claim 10, wherein the predetermined hash value corresponds with the non-changing visual code that includes a universal resource locator that corresponds to an x.509 certificate.

14. The method of claim 10, wherein the predetermined hash value corresponds with the non-changing visual code that includes a uniform resource locator, the uniform resource locator being an address of a website that contains the predetermined hash value.

15. The method of claim 10, wherein the predetermined hash value corresponds with the non-changing visual code that includes a three-dimensional feature of the target device.

16. The method of claim 15, wherein the non-changing visual code is etched into the target device.

17. The method of claim 10, wherein the initiating results from a user pressing a button on the target device.

18. A computer implemented method, comprising:
creating in real time, by a computer device, a hash value, the hash value being of a content in a memory of the computer device created using a hash function on a hash function resident in the memory of the computer device;
displaying, by the computer device, the hash value on an electronic display on the computer device; and
displaying a non-changing visual code on a body of the computer device, the non-changing visual code corresponding to a universal resource locator being readable by a code reader and corresponding to a predetermined hash value that validates a content of the memory of the computer device by matching the predetermined hash value to the hash value and another hash value, wherein the predetermined hash value is embedded in a certificate using an extension mechanism and the another hash value is obtained utilizing a certificate signing request.

19. The computer implemented method of claim 18, wherein the non-changing visual code corresponds to a uniform resource locator, the uniform resource locator being an address of a website that contains the predetermined hash value.

20. The computer implemented method of claim 18, wherein the non-changing visual code is a three-dimensional feature of the body of the computer device.

* * * * *